UNITED STATES PATENT OFFICE.

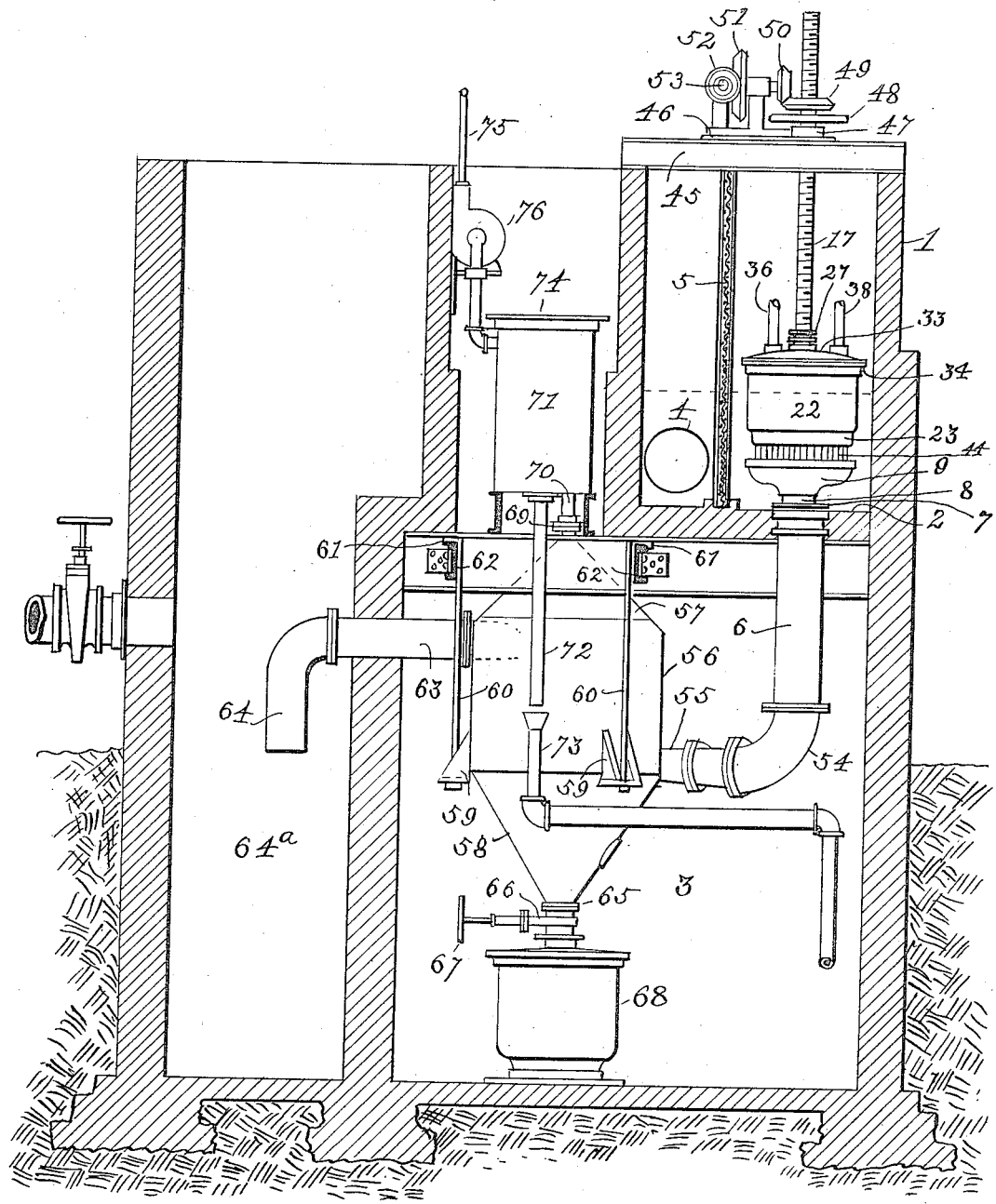

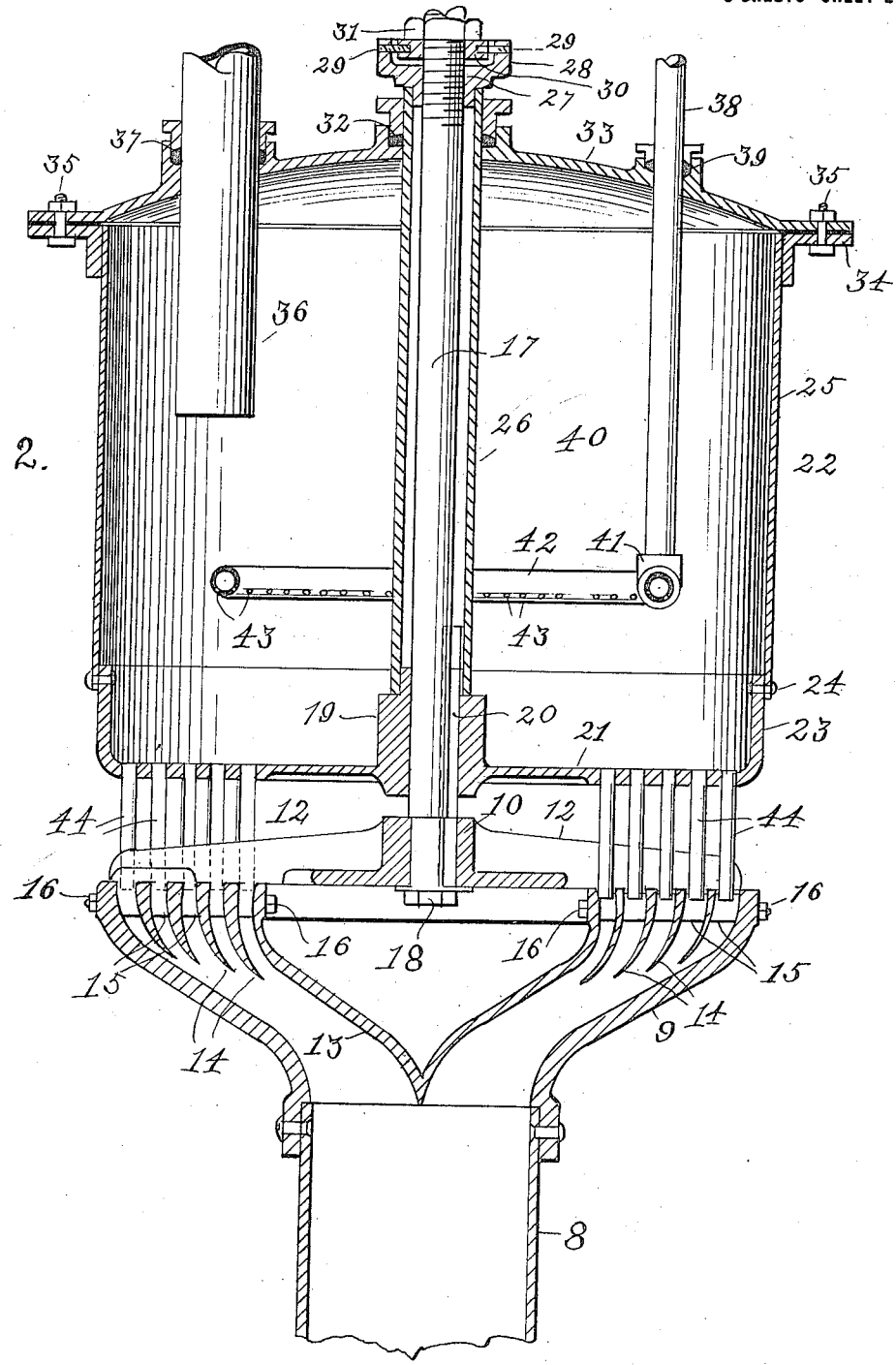

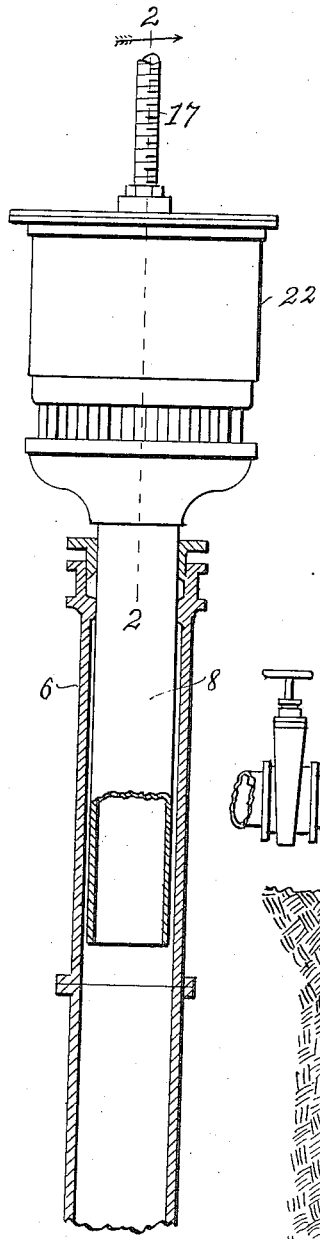
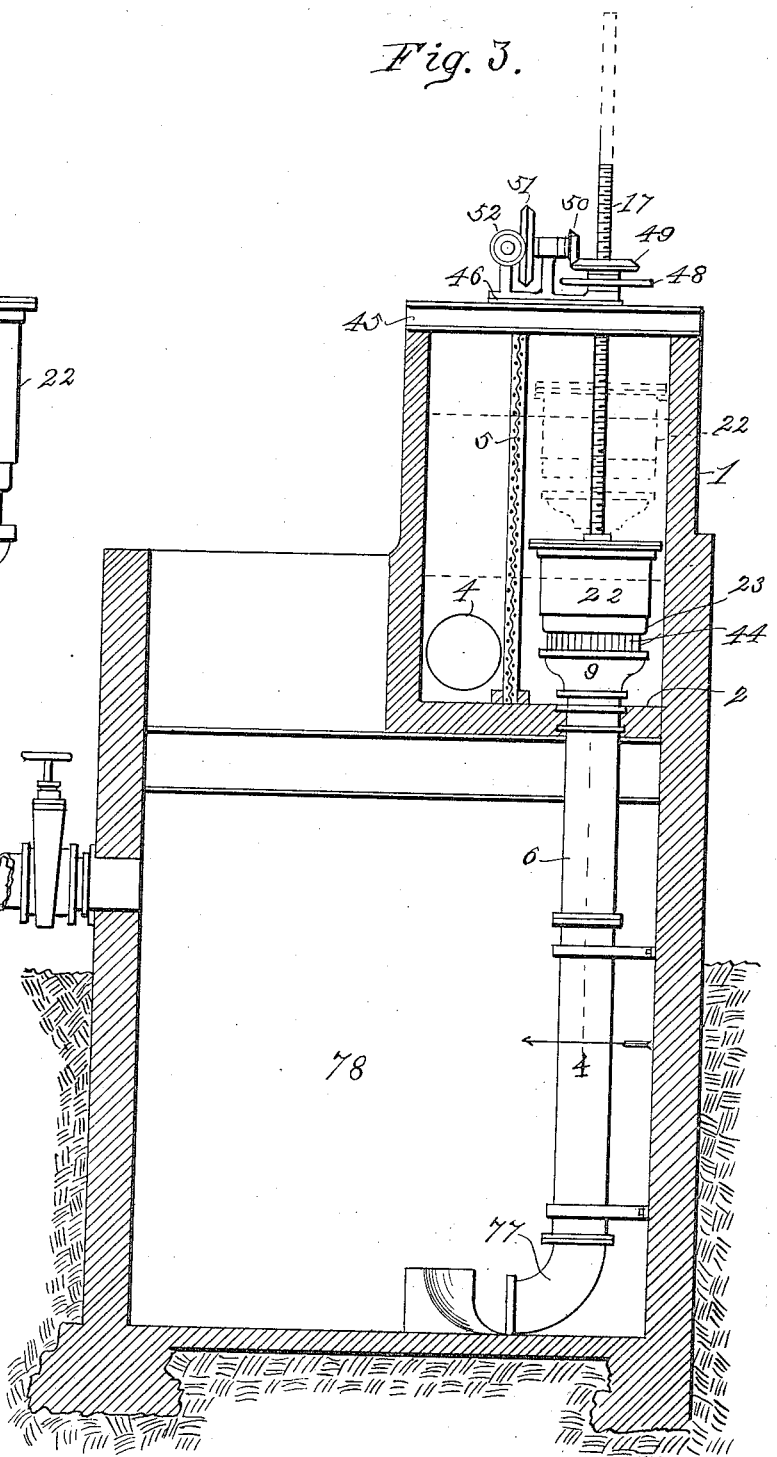

HENRY A. ALLEN, OF CHICAGO, ILLINOIS.

APPARATUS FOR TREATING LIQUIDS.

1,256,862.   Specification of Letters Patent.   Patented Feb. 19, 1918.

Original application filed June 8, 1916, Serial No. 102,453. Divided and this application filed July 16, 1917. Serial No. 180,849.

*To all whom it may concern:*

Be it known that I, HENRY A. ALLEN, residing at Chicago, in the county of Cook and State of Illinois, have invented certain new and useful Improvements in Apparatus for Treating Liquids, of which the following is a description, reference being had to the accompanying drawings, forming a part of this specification, in which corresponding numerals of reference in the different figures indicate like parts.

The object of my invention is to provide a simple and effective apparatus for treating raw water or other liquids in large quantities so as to thoroughly, intimately and uniformly commingle therewith a chemical in gaseous or liquid form to effectively act thereon during the limited period in which they may be brought together, said apparatus being especially applicable for the treatment of water, sewage or the like, so as to promote sedimentation, deodorization, advance useful bacterial action, destroy pathogenic organisms, and render the treated matter useful and inoffensive.

Said invention comprises a division of my pending application for Letters Patent for a water purifying apparatus, Serial No. 102,453 and contemplates generally the use of apparatus substantially like that therein shown for aeration and separation in conjunction with means for introducing a chemical such, for example, as sulfate of alumina or other coagulant, gas or the like adapted to eliminate or destroy pathogenic organisms and to enable said chemical for whatever purpose introduced to be uniformly and thoroughly commingled with the raw water or other material treated. I accomplish said object in the manner hereinafter more particularly described and definitely pointed out in the claims.

In the drawings,

Figure 1 is a transverse vertical sectional view of a concrete receiving tank showing my improved apparatus therein, Fig. 2 is an enlarged central vertical sectional view of the primary mixing device, or aspirator.

Fig. 3 is a section corresponding to that of Fig. 1, showing a modified construction, and Fig. 4 is an enlarged view, partly in section, taken upon the line 4—4, Fig. 3, viewed in the direction of the arrow there shown.

Referring to the drawing, 1, Fig. 1, indicates a receiving-tank having a raised floor 2 with a space below to be utilized for the purposes hereinafter stated, said structure being preferably formed from concrete. An inlet pipe 4 is connected with the receiving tank which, in the example illustrated, is shown as being divided into two compartments by means of a suitable screen 5, for preventing coarse materials in the raw water from entering the apparatus in which the water is to be treated. A vertically arranged pipe 6, has its upper end concreted in the floor 2 or bottom of the receiving tank. Said pipe is provided with a stuffing-box 7 to form a tight joint between it and a vertical tube 8, also shown in Fig. 2, which is extended therein from above and adapted to telescope therewith. The upper end of the tube 8 is connected with the lower part of a funnel-shaped bowl 9 to the top rim of which is secured a spider, generally designated by 10 having arms 12, extended radially therefrom. Located within the bowl and arranged concentrically therewith, is a depending conoidal shaped shell 13, between which and the periphery of the bowl is located a series of annular deflecting rings 14, spaced apart by means of suitable lugs 15. Said rings are connected with the bowl and rigidly held in spaced relation to each other by means of bolts 16. The lower edges of the rings are made thin and are flared inwardly as shown in Fig. 2, to conform as nearly as may be to the outer contour of the central shell 13. The lower edges of said rings are by preference extended to relatively lower levels in the order of their inward succession, the cross sectional areas thereof being proportioned with a view to insure proper fluid velocities. The rings as joined together, constitute a kind of grid which I term an orifice plate, the purpose of which will be presently explained.

Projected through a central bore in the spider 10, is an upwardly extended shaft 17, which is secured at its lower end by means of a nut 18. A hub 19 is slidably fitted upon the shaft, the two having counterpart grooves for the reception of a spline 20, to prevent rotation of the hub. Preferably integral with said hub is a horizontal circular member 21, adapted to form a flat bottom for a hollow cylindrical casing generally designated by 22. The hub, the flat bottom and a portion 23 of the side wall is preferably formed from iron or bronze in one piece, to the upper part of which is riveted at 24 a sheet-metal cylindrical portion 25.

Threaded upon the upper part of the hub 20, is a tube 26, which incloses the shaft 17, said tube having a hub 27, tapped into or otherwise rigidly attached to its upper end. Said hub has formed thereon an upwardly extended annular flange 28 through which screws are passed as shown, into a nut 30 upon the shaft 17 which shaft is screw-threaded from the part 27 to its upper end. The nut 30 is for the purpose of adjusting the relative height of the cylindrical casing 22, and the tubes in the bottom thereof with respect to the orifice-plate as hereinafter described, a lock-nut 31 being provided for securing the nut 30 in place when adjusted.

Tightly fitted around the tube 26 by means of a packing gland 32, Fig. 2, is a top-plate 33, which is secured to an annular rim 34 upon the cylinder 25, by means of bolts 35. A pipe 36 is slidably passed through a gland 37 formed in the top plate 33, said pipe being connected with the open air or with a source of gas supply not shown.

A pipe 38, connected with a source of chemical supply, not shown, is passed through a gland 39, into the cylindrical chamber 40. Attached to the lower end of the pipe 38 by means of a union 41, is a ring-like pipe 42 having fine perforations 43 therein arranged to cause the liquid which may be passed through the pipe 38 to be sprayed downwardly within said chamber and uniformly and evenly distributed therein.

Fitted in bores symmetrically arranged in the bottom of the chamber 40 which may be termed the chemicalizing chamber, are a large number of closely juxtaposed tubes 44 of substantially equal length which are extended downwardly between the arms of the spider into the annular spaces between the rings 14.

Beams 45, Fig. 1, are supported upon the walls of the receiving tank, upon which, in turn, is placed a bearing-plate or base 46, which serves as a support for an adjusting-nut 47 mounted upon the threaded shaft 17. The chemicalizing cylinder and bowl 9 are suspended upon the shaft 17, the purpose of the adjusting-nut being to enable said cylinder and bowl with their several parts, to be raised and lowered to conform to the varying water level of the receiving tank,—the telescoping tube 8 being provided to permit such vertical adjustment. The adjusting-nut 47 may be operated either manually or by power. For the former purpose, a hand-wheel 48 may be provided; for the latter, a beveled gear 49, splined upon the nut 47, may be connected through gears 50, 51 and 52, to a shaft 53, leading to a source of power.

As shown in Fig. 1, the pipe 6 is extended downwardly and connected by means of an elbow 54, with a nozzle 55 leading tangentially into a closed receptacle generally designated by 56, preferably formed from cast metal, which I term a "vortex-whirl." The body portion of said receptacle is cylindrical, while the upper and lower portion designated by 57 and 58 respectively, are of conoidal form. Lugs 59 are formed upon the lower portion of the body of the receptacle, to which are attached in a well known way, suspending rods 60, the upper ends of which are provided with hooks 61, for connecting them with beams 62.

An outlet pipe 63, is tangentially connected with the upper portion of the cylindrical body of the receptacle 56, which pipe is in turn connected with an effluent pipe 64 arranged to discharge into a sedimentation tank 64ª. Formed upon the lower part of the receptacle around a restricted opening, are flanges 65 to which is bolted a shut-off valve 66 having a hand-wheel 67. A sludge-reservoir 68 is detachably connected with the valve casing in a well known way.

The upper part of the receptacle 56 is connected by means of a suitable flanged connection 69, with a pipe 70, in communication with the lower portion of an upper sludge-reservoir 71, having a drain-pipe 72, extending downwardly therefrom and arranged to discharge into an open ended pipe 73, leading to a sewer. A floating weir, not shown, but illustrated in said pending application, upon which I make no claim herein, is located within the reservoir and provided with suitable overflow means capable of permitting a limited overflow in such a manner as to discharge floating particles of matter while preventing an undue waste of water therewith.

A cover 74 is, by preference provided for the reservoir 71, and connected with the upper part of the latter is a pipe 75, leading to the open air in which I prefer to interpose an exhaust-fan 76, or said pipe may lead to a suitable receiver.

The normal "head" of the receiving-tank should be such as to cause a rotative or whirling motion of the water as a result of its tangential introduction into the receptacle 56. The "water-whirl" thus produced within the latter tends to accelerate the movement of sedimentary particles heavier than the liquid, downwardly, and the movement of suspended sedimentary particles lighter than the liquid toward the central axis and thence upwardly. The separated heavy particles are caused to descend to the tapered portion of the receptacle and thence to the sludge-reservoir 68, while the lighter ones ascend through the pipe 70 into the reservoir 71 from whence they may be passed into the drain-pipe to a container for future use.

In addition to the several actions above described the air or gas introduced through the pipe 36 into the cylindrical receptacle 22, and the chemicals introduced through the pipe 38 will, upon entrance to the lower portion of the receptacle 56, be under a pressure, the degree of which will be dependent upon the head or liquid level in the receiving tank. The gas or gases tend to rise rapidly, being influenced in direction by reason of the rotation or whirl of the liquid within the receptacle 56. This action also causes a most thorough, intimate and uniform commingling of the added chemicals with the liquid, while the action of the gases tend to accentuate the whirling action and to increase its efficiency.

The body of the liquid, from which the suspended sedimentary material has been separated, is discharged through the outlet 64, into a suitable receiver.

It is obvious that the material from which the apparatus is formed should be such as would not be injured by contact with the chemicals which would be mixed with the influent.

In Fig. 3, I have shown a modified construction for the treatment of sewage or other influent carrying large quantities of sediment. In said construction, the vortex-whirl has been eliminated and the liquid, with its accompanying sedimentary matter after having passed through the orifice plate contained within the part 9, is discharged through a nozzle 77 into a receiving tank 78. As the influent is passed through the orifice plate, there is thoroughly and uniformly commingled therewith the desired chemicals in liquid or gaseous form or both, drawn from the receptacle 22 as desired. The dotted lines indicate the varying levels in the receiving tank and the relative heights to which the part 22 may be adjusted.

The construction described contemplates the saving for reuse if desired, of such chemicals or chemicalized gases as may be delivered into the pipe 75.

Having thus described my invention, I claim:

1. A device of the class described, in which is combined a receiving channel, a receiving tank, an orifice-plate located in the receiving channel, said plate having a plurality of narrow passages therein to permit an inflow of liquid from said receiving channel said passages leading to a conduit in communication with said receiving tank, a receptacle located above said orifice-plate, a multiplicity of small conduits leading from said receptacle to the openings in said orifice-plate at a level below that of the influent in the receiving channel and means within said receptacle in operative connection with a source of supply for delivering a chemicalized fluid to the openings in said orifice-plate.

2. A device of the class described in which is combined a receiving channel, a receiving tank, an orifice plate having a plurality of narrow passages therein to permit an inflow from said receiving channel, said passages leading to a conduit in communication with said receiving tank, means for adjusting the height of said orifice-plate with respect to that of the level of the influent in said channel, a receptacle above said orifice-plate from which the influent is excluded, conduits leading from said receptacle to the openings in said orifice-plate, a source of fluid chemical supply and means within said receptacle in communication with said source of chemical supply for uniformly distributing a chemicalized fluid to the conduits in said receptacle.

3. A system of the class described, comprising, in combination, a receiving channel, an aspirator located therein, means for supplying a chemicalized fluid to said aspirator, a vortex-whirl in communication with said aspirator at a sufficient level below the latter to provide a predetermined liquid head, said vortex-whirl consisting of a circular vessel having upper and lower conoidal shaped ends, means for discharging separated material of different gravities from said ends, means for introducing liquid from said aspirator tangentially into the body of said circular vessel and means for discharging liquid tangentially therefrom.

4. A system of the class described, comprising, in combination, a receiving channel, an aspirator located therein, means for introducing a chemicalized fluid to said aspirator, means in communication with said aspirator for conveying an influent to a vortex-whirl, a vortex-whirl located at a lower level than that of said aspirator, said vortex-whirl comprising a vessel circular in cross-section, the upper and lower ends of which are conoidal in form, a sludge-receptacle in communication with the lower end of said vessel and one at the upper end with an overflow waste discharge, a tangentially arranged inlet pipe for connecting the body of said vessel with said aspirator, a well and a tangentially arranged outlet pipe leading thereto from the body of said vessel.

5. A system of the class described, comprising, in combination, a channel for the reception of an influent, an aspirator located therein, comprising an influent member having a plurality of channels for allowing a downward flow of liquid in separate streams, a common conduit in communication with said channels, a receptacle partially submerged in said receiving-tank, open-ended fluid-conduits in said receptacle in communication with the interior of said receptacle and with said influent channels, means for introducing chemicals to said receptacle, and a vortex-whirl in communication with said common conduit.

6. A system of the class described, comprising, in combination, a receiving tank, an aspirator located therein having an influent receiving member provided with orifices therein for permitting a downward flow of said influent, a partially submerged receptacle having open ended conduits extending downward through its bottom into communication with said orifices while the upper ends are in communication with the interior of said receptacle, the discharge ends of said conduits being of lesser area than that of said orifices, means for introducing a chemical into said receptacle, means for admitting a gaseous fluid thereto, a vortex-whirl and means for connecting the same with said orifices, said connecting means being arranged tangentially to the body of said vortex-whirl.

7. A system of the class described, comprising, in combination, a receiving channel, an aspirator located therein, having an influent receiving member, an orifice-plate located in said member provided with a multiplicity of orifices for the admission of said influent, a partially submerged receptacle having a separate conduit leading therefrom into operative communication with each of said orifices, means for raising and lowering said receptacle, means for admitting a chemicalizing fluid thereto, a vortex-whirl situated at a lower level, and means for conveying chemicalized liquid from said receiving member to said vortex whirl.

8. A system of the class described, comprising, in combination a receiving channel, an influent receiving member located therein for receiving and conveying an influent to a receptacle at a lower level, a plurality of concentric rings located at a common level in the upper part of said receiving member said rings being spaced apart, means in communication with a source of fluid chemical supply and with the spaces between said rings for introducing a fluid chemical thereto, the contour of said rings and the area of the spaces between them being such as to cause proper fluid velocities for entraining the chemical with the influent admitted to said spaces.

9. A system of the class described, comprising, in combination a receiving channel, an aspirator located therein, means for admitting a chemicalized fluid to said aspirator, a vortex-whirl in communication with said aspirator at a predetermined level below the latter, said vortex-whirl comprising a vessel circular in cross-section, means for discharging separated material of different gravities from the bottom and top respectively, means for introducing liquid from said aspirator tangentially into the body of said circular vessel, means for discharging liquid tangentially therefrom and suction means for removing and conveying chemicalized gases to a predetermined point.

In testimony whereof, I have signed this specification in the presence of two subscribing witnesses, this 30th day of June, 1917.

HENRY A. ALLEN.

Witnesses:
 DAVID H. FLETCHER,
 JENNIE L. FISKE.